US011068294B2

United States Patent
Turull et al.

(10) Patent No.: US 11,068,294 B2
(45) Date of Patent: Jul. 20, 2021

(54) BALANCING PROCESSING LOADS OF VIRTUAL MACHINES

(71) Applicant: Telefonaktiebolaget LM Ericsson (publ), Stockholm (SE)

(72) Inventors: Daniel Turull, Sundbyberg (SE); Lars Westberg, Enköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 241 days.

(21) Appl. No.: 15/775,774

(22) PCT Filed: Nov. 26, 2015

(86) PCT No.: PCT/SE2015/051271
§ 371 (c)(1),
(2) Date: May 11, 2018

(87) PCT Pub. No.: WO2017/091116
PCT Pub. Date: Jun. 1, 2017

(65) Prior Publication Data
US 2018/0349167 A1    Dec. 6, 2018

(51) Int. Cl.
*G06F 9/455* (2018.01)
*G06F 9/50* (2006.01)

(52) U.S. Cl.
CPC ........ *G06F 9/45558* (2013.01); *G06F 9/5083* (2013.01); *G06F 2009/4557* (2013.01); *G06F 2009/45595* (2013.01)

(58) Field of Classification Search
CPC .............. G06F 9/45558; G06F 9/5083; G06F 2009/4557; G06F 2009/45595
See application file for complete search history.

(56) References Cited

U.S. PATENT DOCUMENTS

| 8,127,084 B2* | 2/2012 | Gill .................... G06F 12/0804 711/100 |
| 8,209,681 B1* | 6/2012 | Turner .................. G06F 11/301 718/1 |

(Continued)

OTHER PUBLICATIONS

International Search Report and Written Opinion of the International Searching Authority, PCT/SE2015/051271, dated Aug. 19, 2016, 9 pages.

(Continued)

*Primary Examiner* — Meng Al T An
*Assistant Examiner* — Willy W Huaracha
(74) *Attorney, Agent, or Firm* — Sage Patent Group (57) ABSTRACT

A method is discussed for balancing processing loads to at least a first and a second VM instances associated with the same processing circuitry. Information about first and second applications respectively running on the first and second VM instances is obtained. Incoming data corresponding to a first and second pluralities of jobs to be performed respectively by the first and second VM instances is received. Based on the obtained information and on the received data, a first number of the first plurality of jobs which the first VM instance is allowed to perform is determined by means of the processing circuitry, and a second number of the second plurality of jobs which the second VM instance is allowed to perform is determined by means of the processing circuitry. The first VM instance is instructed to release the processing circuitry after having performed the determined first number of jobs to allow the second VM instance to use the processing circuitry for performing the second number of jobs.

14 Claims, 7 Drawing Sheets

(56) References Cited

U.S. PATENT DOCUMENTS

| | | | | |
|---|---|---|---|---|
| 2005/0132363 | A1* | 6/2005 | Tewari | G06F 9/45558 718/1 |
| 2010/0274890 | A1* | 10/2010 | Patel | G06F 9/4862 709/224 |
| 2013/0054813 | A1 | 2/2013 | Bercovici et al. | |
| 2013/0111470 | A1* | 5/2013 | Bozek | G06F 9/4881 718/1 |
| 2014/0280969 | A1* | 9/2014 | Wood | H04L 47/125 709/226 |
| 2015/0074222 | A1 | 3/2015 | Liang et al. | |
| 2016/0092250 | A1* | 3/2016 | Wagner | G06F 9/45558 718/1 |

OTHER PUBLICATIONS

Guan, B., et al., "CIVSched: A Communication-Aware Inter-VM Scheduling Technique for Decreased Network Latency Between Co-Located VMs," IEEE Transactions on Cloud Computing, vol. 2, Issue 3, Jul.-Sep. 2014 (Published Jun. 5, 2014) 14 pages.

Kiszka, J., "Towards a Linux as a Real-Time Hypervisor," Siemens AG, Corporate Technology, 11th Real-Time Linux Workshop, Dresden, Sep. 28-30, 2009, 10 pages.

Hu, L., et al., "Magnet: A Novel Scheduling Policy for Power Reduction in Cluster With Virtual Machines," 2008 IEEE International Conference on Cluster Computing, (XP031355603) Sep. 29, 2008, pp. 13-22.

Vishnupriya, S., et al., "Effective Management of Resource Allocation and Provisioning Cost Using Virtualization in Cloud," 2014 IEEE International Conference on Advanced Communication Control and Computing Technologies, (XP032726967) May 8, 2014, pp. 1726-1731.

Amaral, M., et al., "Performance Evaluation of Microservices Architectures Using Containers," 2015 IEEE 14th International Symposium on Network Computing and Applications, (XP032846262) Sep. 28, 2015, pp. 27-34.

Hwang, J., et al., "NetVM: High Performance and Flexible Networking Using Virtualization on Commodity Platforms," IEEE Transactions on Network and Service Management, vol. 12, No. 1, (XP011575906) Mar. 1, 2015, pp. 34-47.

Foster, I., et al., Virtual Clusters for Grid Communities, 2006 IEEE 6th International Symposium on Cluster Computing and the Grid (XP010918252) May 16-19, 2006, pp. 513-520.

* cited by examiner

BALANCING PROCESSING LOADS OF VIRTUAL MACHINES

CROSS REFERENCE TO RELATED APPLICATIONS

This application is a 35 U.S.C. § 371 national stage application of PCT International Application No. PCT/SE2015/051271 filed on Nov. 26, 2015, the disclosure and content of which is incorporated by reference herein in its entirety.

TECHNICAL FIELD

The present disclosure relates to a method for balancing processing loads to a first and a second virtual machine (VM) instance.

BACKGROUND

Computer virtualization is a technique that permits to abstract the different hardware in a computer platform and execute different operating systems. There are several ways of virtualizing a system but the most commonly used is the one that uses a Virtual Machine Monitor (VMM), sometimes also called hypervisor. The hypervisor is a layer of software that provides to the virtual machine the illusion that it is running its own resources.

Virtual Machines (VM) are usually scheduled using the VMM scheduler, which decides which VM is going to be executed in the shared Central Processing Unit (CPU). The execution of a process is pre-empted when the process has exceeded its allotted time budget or when it voluntarily releases the CPU due to lack of work because it's process is waiting for some input/output operation (disk, network or the like).

Figure 1:
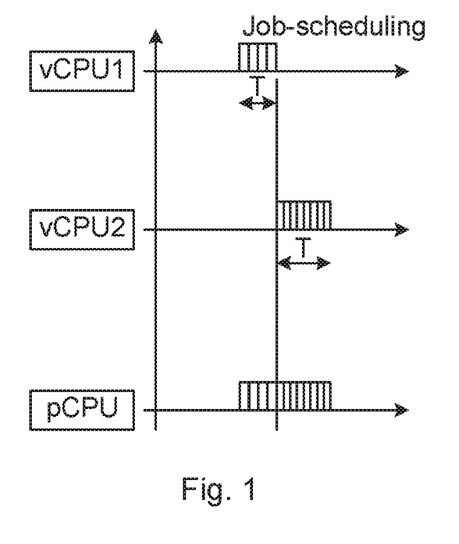
FIG. 1 illustrates dividing processing resources of a CPU between two virtual CPUs of different VMs according to prior art.

FIG. 1 illustrates how processor resources of a physical CPU (pCPU) are divided between a first virtual CPU (vCPU1) of a first VM and a second virtual CPU (vCPU2) of a second VM by an allotted time budget T.

Lightweight virtualization is a method of providing isolation between different applications that sees the operating system, since they are the only users. Lightweight virtualization provides mechanism to reduced overhead compare to virtualization with hypervisors.

Real-Time Operating Systems (RTOS) provide a common ground to execute tasks or processes that have deadlines for when they need to be executed. Some example of these kinds of tasks can be control systems in industrial applications, multimedia applications, car control systems or telecommunications control systems.

Control network applications that execute some tasks after the arrival of a network frame are common in telecom applications. These applications usually have strict deadlines on when the tasks need to be completed. Latency sensitive applications are usually executed in a reserved CPU in order to guarantee that the CPU will be idle and ready for execution when a network frame arrives with a task that needs to be executed.

The consolidation of multiple workloads in a single host increases the efficiency of the system and reduces the energy consumption, since less processing recourses are used for executing the same amount of tasks.

J. Kiszka "Towards Linux as a real-time hypervisor", 11th Real Time Linux Workshop (RTLWS11), 2009, Dresden, Germany, proposes to make Kernel-based Virtual Machine (KVM) able to virtualize a real-time system using the real time Linux kernel. KVM VMs use Quick Emulator (QEMU) as emulator, which is a normal process. Changing the priorities to real time (RT) can increase responsiveness. It also changes the kernel for the host to be RT. Further, it introduces scheduler para-virtualization, which notifies the host when a VM needs to execute a RT process in order to boost its priority. They modify kernel parameters to obtain sub-millisecond latencies.

Bei Guan, Jingzheng Wu, Yong Ji Wang and S. U. Khan, "CIVSched: A Communication-Aware Inter-VM Scheduling Technique for Decreased Network Latency between Co-Located VMs", Cloud Computing, Institute of Electrical and Electronics Engineers (IEEE) Transactions, vol. 2, no. 3, pages. 320, 332, July-September, present a VM-scheduler that is aware of the communication between two VMs that resides in the same host. It inspects the network packets between VMs and prioritizes the execution between them to reduce the latency of the communication.

Consolidating multiple VMs in a single host reduces the energy consumption and increases the utilization/efficiency of the system. When a task is executed inside a VM and the VM needs to process multiple received data frames, the VM will release the CPU when the processing of all the incoming frames is complete or the CPU scheduler decides to schedule another VM. This introduces jitter (deviation in response times) in the response of the application running on the VM and unpredictable execution of the frames.

A common practice to reduce latency is to reserve the CPU to a single VM but this limits the scalability of the system, since it reduces the effective utilization of the complete system.

SUMMARY

It is an objective of the present disclosure to provide an improved balancing of processing loads of a plurality of VM instances sharing processor resources in order to e.g. reduce jitter.

According to an aspect of the present disclosure there is provided a method for balancing processing loads to at least a first and a second VM instance, wherein the at least first and second VM instances are associated with the same processing circuitry. The method comprises obtaining information about a first application running on the first VM instance and about a second application running on the second VM instance. The method also comprises receiving incoming data corresponding to a first plurality of jobs to be performed by the first VM instance and a second plurality of jobs to be performed by the second VM instance. The method also comprises, based on the obtained information about the first and second applications and on the received data, determining a first number of the first plurality of jobs which the first VM instance is allowed to perform by means of the processing circuitry, and a second number of the second plurality of jobs which the second VM instance is allowed to perform by means of the processing circuitry. The method also comprises instructing the first VM instance to release the processing circuitry after having performed the determined first number of jobs to allow the second VM instance to use the processing circuitry for performing the second number of jobs.

According to another aspect of the present disclosure there is provided a network arrangement configured for balancing processing loads to at least a first and a second VM instance, wherein the at least first and second VM instances are associated with the same processing circuitry. The network arrangement comprises processor circuitry, and storage storing instructions executable by said processor circuitry whereby said network arrangement is operative to obtain information about a first application running on the first VM instance and about a second application running on the second VM instance. The network arrangement is also operative to receive incoming data corresponding to a first plurality of jobs to be performed by the first VM instance and a second plurality of jobs to be performed by the second VM instance. The network arrangement is also operative to, based on the obtained information about the first and second applications and on the received data, determine a first number of the first plurality of jobs which the first VM instance is allowed to perform by means of the processing circuitry, and a second number of the second plurality of jobs which the second VM instance is allowed to perform by means of the processing circuitry. The network arrangement is also operative to instruct the first VM instance to release the processing circuitry after having performed the determined first number of jobs to allow the second VM instance to use the processing circuitry for performing the second number of jobs.

According to another aspect of the present disclosure there is provided a computer program product comprising computer-executable components for causing an embodiment of a network arrangement to perform the method of the present disclosure when the computer-executable components are run on processor circuitry comprised in the network arrangement.

According to another aspect of the present disclosure there is provided a computer program for balancing processing loads to at least a first and a second VM instance, wherein the at least first and second VM instances are associated with the same processing circuitry. The computer program comprises computer program code which is able to, when run on processor circuitry of a network arrangement, cause the network arrangement to obtain information about a first application running on the first VM instance and about a second application running on the second VM instance. The code is also able to cause the network arrangement to receive incoming data corresponding to a first plurality of jobs to be performed by the first VM instance and a second plurality of jobs to be performed by the second VM instance. The code is also able to cause the network arrangement to, based on the obtained information about the first and second applications and on the received data, determine a first number of the first plurality of jobs which the first VM instance is allowed to perform by means of the processing circuitry, and a second number of the second plurality of jobs which the second VM instance is allowed to perform by means of the processing circuitry. The code is also able to cause the network arrangement to instruct the first VM instance to release the processing circuitry after having performed the determined first number of jobs to allow the second VM instance to use the processing circuitry for performing the second number of jobs.

According to another aspect of the present disclosure there is provided a computer program product comprising an embodiment of the computer program of the present disclosure and a computer readable means on which the computer program is stored.

It is advantageous that, in accordance with the present disclosure, the first VM instance is allowed to perform a predefined number of jobs before it releases the processing circuitry (the processing resources which are shared with the second VM instance). Thus, the first VM instance does not risk getting cut off from the processing circuitry in the middle of a job when e.g. an allotted time budget has been consumed. Jitter can thereby be reduced.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In order to reduce the jitter, a network arrangement may comprise a load balancer which may study and possibly modify incoming data to instruct a VM for how long it is allowed to execute jobs before releasing/pausing its execution. This temporally starves the application running on the VM and therefore forces an earlier release of the CPU, i.e. release of the processing resources in the form of processing circuitry. Then, the scheduler may assign the processor circuitry to a second VM instance. This may be an indirect way of controlling the CPU scheduler to provide a more granular use of processing resources to the VM application without modifying the CPU scheduler.

Thus, embodiments of the present disclosure allow a more granular multiplexing of the processing resources consumed by applications running on VM instances which receive data comprising jobs. It may not be required to modify the operating system scheduler; since it may only require the addition of a network load balancer within the network arrangement, either within the host of the VM instances or external to the host. The application running on a VM instance may not need to be aware of the load balancer, since the load balancer may intercept the data upstream of the application. Stopping the execution after completing a job, reduces the jitter introduced by the host.

The network arrangement discussed herein comprises the host of the VM instances, and also comprises the load balancer which may be comprised in the host or be external to the host. The host may e.g. be a node comprising processing circuitry and a VMM. If the load balancer is comprised in the host, it may use or comprise at least part of the processor circuitry which is also used for executing the jobs of the VM instances, or it may comprise its own dedicated processing circuitry. If the load balancer is external to the host, it will typically comprise processing circuitry which is separate from the processor circuitry which is used for executing the jobs of the VM instances in the host, but still comprised in the network arrangement.

A VM instance may e.g. be a virtual machine, or a container in a virtual machine, e.g. a virtual machine comprising a plurality of containers typically using the same guest operating system and stack/kernel.

As an example, a network arrangement with two, a first and a second, VM instances is discussed herein, but the network arrangement may similarly comprise any number of VM instances.

Figure 2A:
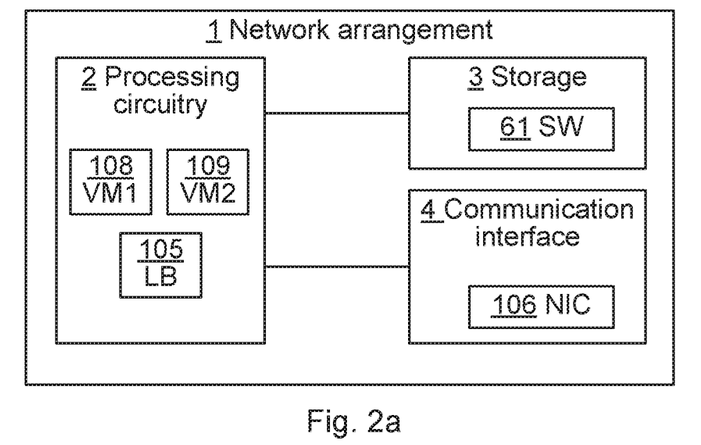
FIG. 2a is a schematic block diagram of an embodiment of a network arrangement in accordance with the present disclosure.

FIG. 2a schematically illustrates an embodiment of a network arrangement 1 of the present disclosure. The network arrangement comprises processor circuitry 2 e.g. a central processing unit (CPU). The processor circuitry 2 may comprise one or a plurality of processing units in the form of microprocessor(s). However, other suitable devices with computing capabilities could be comprised in the processor circuitry 2, e.g. an application specific integrated circuit (ASIC), a field programmable gate array (FPGA) or a complex programmable logic device (CPLD). The processor circuitry 2 is configured to run one or several computer program(s) or software (SW) 61 (see also FIG. 6) stored in a storage 3 of one or several storage unit(s) e.g. a memory. The SW 61 may e.g. comprise computer program which, when run on the processor circuitry 2, forms the load balancer (LB) 105 as well as a first VM instance 108 and a second VM instance 109. In accordance with the present disclosure, the first and second VM instances share processing circuitry (processing resources) such that only one of the VM instances can use the shared processing circuitry at any one time. The load balancer may also use the shared processing circuitry or may comprise dedicated processing circuitry of the processing circuitry 2 in the network arrangement 1. The storage unit is regarded as a computer readable means 62 (see FIG. 6) as discussed herein and may e.g. be in the form of a Random Access Memory (RAM), a Flash memory or other solid state memory, or a hard disk, or be a combination thereof. The processor circuitry 2 may also be configured to store data in the storage 3, as needed. The network arrangement 1 also comprises a communication interface 4 which may comprise a transmitter and a receiver, which may be combined to form a transceiver or be present as distinct units within the network arrangement, e.g. in a network interface controller (NIC) 106, possibly on a network interface card.

According to another aspect of the present disclosure there is provided a network arrangement 1 configured for balancing processing loads to at least a first and a second VM instance 108 and 109, wherein the at least first and second VM instances are associated with the same processing circuitry 2. The network arrangement comprises processor circuitry 2, and storage 3 storing instructions 61 executable by said processor circuitry whereby said network arrangement, e.g. the load balancer 105, is operative to obtain information about a first application running on the first VM instance 108 and about a second application running on the second VM instance 109. The network arrangement is also operative to receive incoming data corresponding to a first plurality of jobs to be performed by the first VM instance and a second plurality of jobs to be performed by the second VM instance. The network arrangement 1 is also operative to, based on the obtained information about the first and second applications and on the received data, determine a first number of the first plurality of jobs which the first VM instance is allowed to perform by means of the processing circuitry 2, and a second number of the second plurality of jobs which the second VM instance is allowed to perform by means of the processing circuitry. The network arrangement is also operative to instruct the first VM instance to release the processing circuitry 2 after having performed the determined first number of jobs to allow the second VM instance to use the processing circuitry for performing the second number of jobs.

Figure 2B:
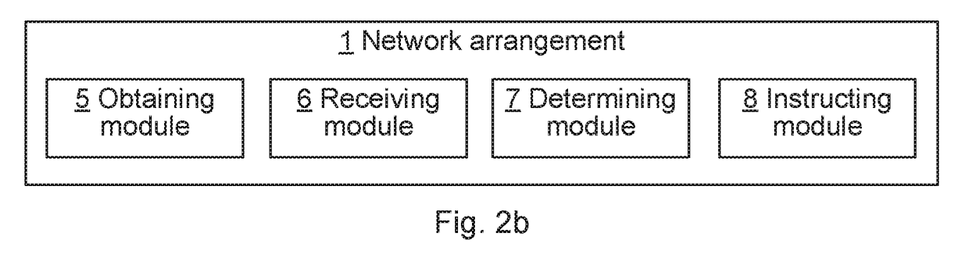
FIG. 2b is a schematic functional block diagram of an embodiment of a network arrangement in accordance with the present disclosure.

FIG. 2b is a schematic block diagram functionally illustrating an embodiment of the network arrangement 1 in FIG. 2a. As previously mentioned, the processing circuitry 2 may run software 61 for enabling the network arrangement 1 to perform an embodiment of the method of the present disclosure, whereby functional modules may be formed in network arrangement 1 e.g. in the processor circuitry 2 for performing the different steps of the method. These modules are schematically illustrated as blocks within the network arrangement 1. Thus, the network arrangement 1 comprises an obtaining module 5 for obtaining information about a first application running on the first VM instance 108 and about a second application running on the second VM instance 109. The network arrangement 1 also comprises a receiving module 6 for receiving incoming data corresponding to a first plurality of jobs to be performed by the first VM instance and a second plurality of jobs to be performed by the second VM instance 109. The network arrangement 1 also comprises a determining module 7 for, based on the obtained information about the first and second applications and on the received data, determining a first number of the first plurality of jobs which the first VM instance 108 is allowed to perform by means of the processing circuitry 2, and a second number of the second plurality of jobs which the second VM instance 109 is allowed to perform by means of the processing circuitry 2. The network arrangement 1 also comprises an instructing module 8 for instructing the first VM instance 108 to release the processing circuitry 2 after having performed the determined first number of jobs to allow the second VM instance 109 to use the processing circuitry for performing the second number of jobs.

Alternatively, the modules 5-8 may be formed by hardware, or by a combination of software and hardware.

According to another aspect of the present disclosure there is provided a network arrangement 1 configured for balancing processing loads to at least a first and a second VM instance 108 and 109, wherein the at least first and second VM instances are associated with the same processing circuitry 2. The network arrangement comprises means 5 (e.g. in cooperation with the communication interface 4) for obtaining information about a first application running on the first VM instance 108 and about a second application running on the second VM instance 109. The network arrangement 1 also comprises means 6 (e.g. in cooperation with the communication interface 4) for receiving incoming data corresponding to a first plurality of jobs to be performed by the first VM instance and a second plurality of jobs to be performed by the second VM instance 109. The network arrangement 1 also comprises means 7 for, based on the obtained information about the first and second applications and on the received data, determining a first number of the first plurality of jobs which the first VM instance 108 is allowed to perform by means of the processing circuitry 2, and a second number of the second plurality of jobs which the second VM instance 109 is allowed to perform by means of the processing circuitry 2. The network arrangement 1 also comprises means 8 for instructing the first VM instance 108 to release the processing circuitry 2 after having performed the determined first number of jobs to allow the second VM instance 109 to use the processing circuitry for performing the second number of jobs.

Figure 3:
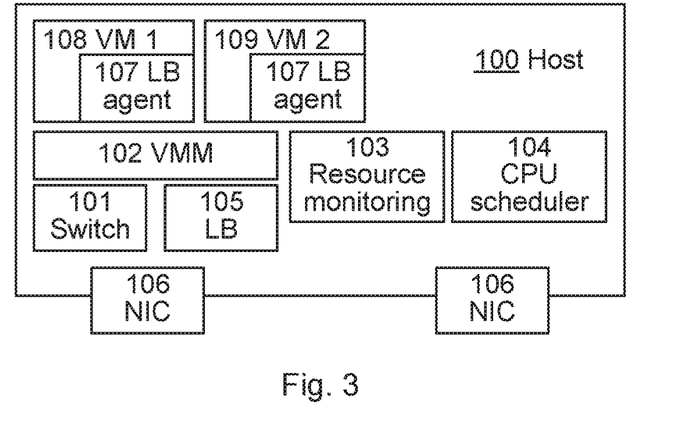
FIG. 3 is a schematic block diagram of an embodiment of a VM host in which a load balancer is comprised in said host, in accordance with the present disclosure.

FIG. 3 illustrates an embodiment of a host 100. The host comprises a first VM instance 108 and a second VM instance 109, each of which comprises an LB agent 107 for communication with the LB 105. A resource monitoring entity 103 is responsible for collecting processing circuitry 2 usage statistics that the method in the LB 105 may use as input. The host also comprises conventional elements of a VM host, generally configured to operate in conventional ways, such as a VMM 102, a switch 101, a CPU scheduler 104 and the one or several NIC 106.

The host 100 may be a computer platform, which executes several VM instances 108 and 109. The host comprises one or multiple CPUs forming part of the processing circuitry 2, storage 3 and communication interface(s) 4. Network applications run on the VM instances, which execute jobs that are received through NIC 106. The host comprises a VMM 102, which can also be called a hypervisor. The CPU scheduler 104 is responsible for the decision on multiplexing the execution of the VM instances. The here introduced LB 105 may be responsible for performing the method proposed herein. The LB might be upstream of the switch 101, or co-located with the switch. A resource monitoring entity 103 may be responsible for collecting processing circuitry usage statistics that the method inside the LB 105 may use as input.

The LB agent 107 is co-located inside each VM instance, VM or container, or implemented within the application running thereon.

Figure 4:
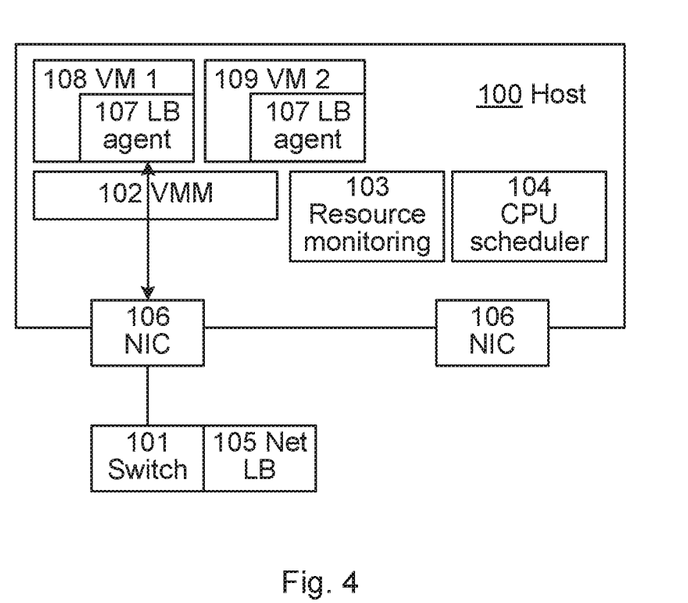
FIG. 4 is a schematic block diagram of an embodiment of a VM host associated with an external load balancer, in accordance with the present disclosure.

FIG. 4 illustrates another embodiment of a host 100. The host is as discussed with reference to FIG. 3 but for the LB 105 being located externally of the host, using a pass-through mechanism e.g. Single Root Input-Output, I/O, Virtualization (SR-IOV). In this case, the host 100 does not comprise the switch 101 and the method may be implemented in the LB 105 in an external node outside the host, which can be a network component between the source of the data traffic to the host, and the host.

Figure 5:
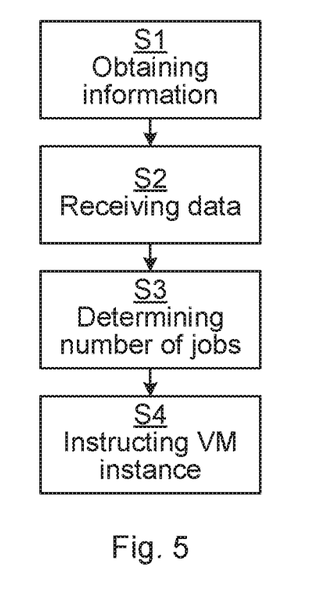
FIG. 5 is a schematic flow chart of an embodiment of the method of the present disclosure.

FIG. 5 illustrates an embodiment of the method of the present disclosure. The method is for balancing processing loads to at least a first and a second VM instance 108 and 109, wherein the at least first and second VM instances are associated with the same processing circuitry 2. The method may be performed by the network arrangement 1 as discussed herein, e.g. by the LB 105.

The method comprises obtaining S1 information about a first application running on the first VM instance 108 and about a second application running on the second VM instance 109. If the method is performed by the LB 105, the LB may thus be application aware, in contrast to the VMM 102. The LB may thus know how much processing resources are needed by the first or second VM instance, e.g. how long time the VM instance requires access to the shared processing circuitry 2, to execute a received job. The application running on the first and/or second VM instance may be any entity which has need of executing a job, such as a proxy server, a web server, or a Packet Data Network, PDN, gateway (PGW).

The method also comprises receiving S2 incoming data corresponding to a first plurality of jobs to be performed by the first VM instance 108 and a second plurality of jobs to be performed by the second VM instance 109. For instance, the LB 105 may perform sniffing on the incoming data stream, e.g. of a Transmission Control Protocol (TCP) session, to the host 100, or it may otherwise receive and re-transmit the data stream.

The method also comprises, based on the obtained S1 information about the first and second applications and on the received S2 data, determining S3 a first number of the first plurality of jobs which the first VM instance 108 is allowed to perform by means of the processing circuitry 2, and a second number of the second plurality of jobs which the second VM instance 109 is allowed to perform by means of the processing circuitry 2. For example, since the LB is application aware, the LB knows how long time each job will take to execute, as well as the number of jobs received for each of the VM instances, and may also know e.g. the priority of the job, and may thus determine suitable first and second number of jobs, which may be the same or different number of jobs, for the first and second VM instances 108 and 109.

The method also comprises instructing S4 the first VM instance 108 to release the processing circuitry 2 after having performed the determined first number of jobs to allow the second VM instance 109 to use the processing circuitry for performing the second number of jobs. By means of this instruction, the VM instance is allowed to stop executing jobs and thus release the processing circuitry after a job has been executed without risk of interruption in the middle of a job.

In some embodiments, the instructing S4 the first VM instance 108 comprises sending information about the first number of jobs to the first VM instance, allowing the first VM instance to release the processing circuitry 2 after it has performed the first number of jobs. In this case, the first VM instance may itself keep track of the number of jobs it is allowed to execute before it has to release the processing circuitry.

Alternatively, in some embodiments, the instructing S4 the first VM instance 108 comprises sending, after the first VM instance has performed the first number of jobs, an order to release the processing circuitry 2 to the first VM instance. In this case, e.g. the LB 105, may keep track of the number of jobs the first VM instance is allowed to execute before it has to release the processing circuitry, and sends the release order after they have been executed.

In some embodiments, the first and second VM instances 108 and 109 are containers within a single virtual machine.

Alternatively, in some embodiments, the first and second VM instances 108 and 109 are comprised in respective first and second virtual machines.

In some embodiments, the method is performed by a load balancer 105 which is co-located with the first and second VM instances 108 and 109, e.g. in the host 100 as discussed herein.

Alternatively, in some embodiments, the method is performed by a load balancer 105 connected to the first and second VM instances 108 and 109 via a NIC 106.

Figure 6:
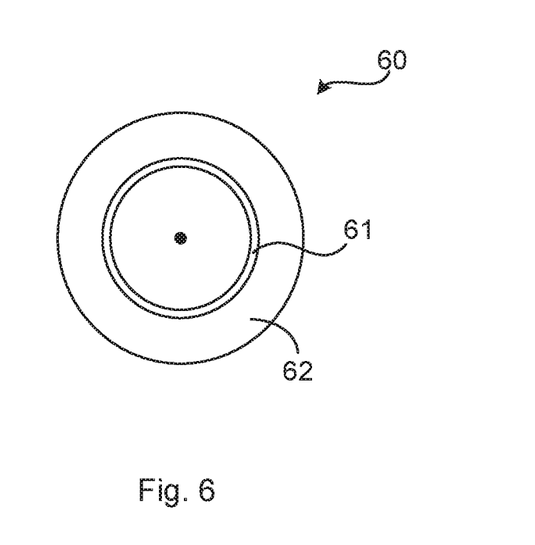
FIG. 6 is a schematic illustration of an embodiment of a computer program product of the present disclosure.

FIG. 6 illustrates an embodiment of a computer program product 60. The computer program product 60 comprises a computer readable (e.g. non-volatile and/or non-transitory) medium 62 comprising software/computer program 61 in the form of computer-executable components. The computer program 61 may be configured to cause a network arrangement 1, e.g. an LB 105 of the network arrangement 1, e.g. as discussed herein, to perform an embodiment of the method of the present disclosure. The computer program may be run on the processor circuitry 2 of the network arrangement 1 for causing it to perform the method. The computer program product 60 may e.g. be comprised in a storage unit or memory 3 comprised in the network arrangement 1 and associated with the processor circuitry 2. Alternatively, the computer program product 60 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Example 1—Limited Number of Jobs in the VM Instance Queue

The arrival data corresponding to jobs may be used to schedule the VM instances 108 and 109 in a way that the different VM instances do not interfere with the execution of the other instances executed in the same shared processing circuitry 2.

Every time data is received by the application, a job is schedule to be run on the application. A job is the consequence of receiving data into the application.

Figure 7:
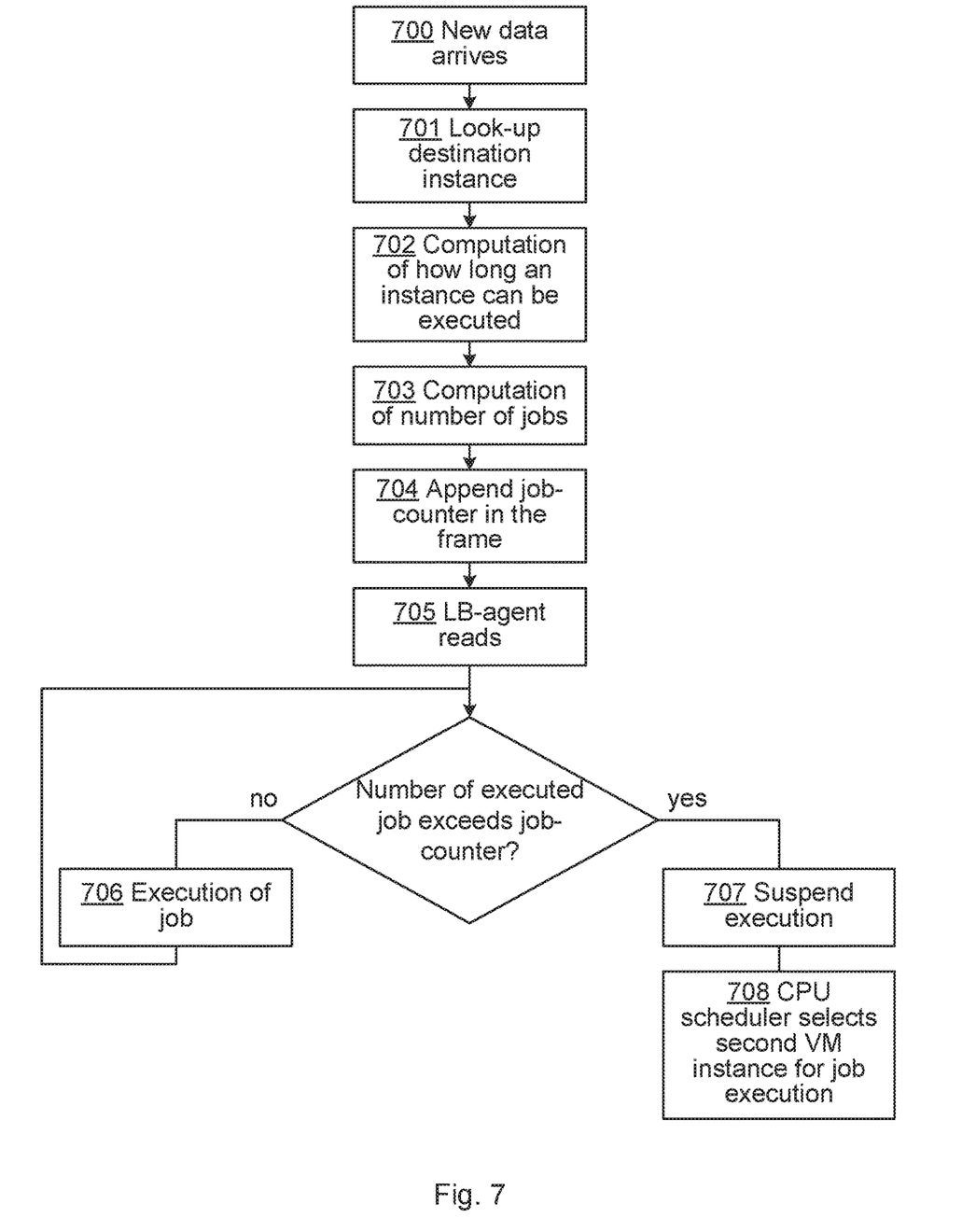
FIG. 7 is a schematic flow chart of an example embodiment of the method of the present disclosure.

An embodiment of the method executed inside the LB 105 is illustrated in FIG. 7. New data arrives 700 into the LB. The LB does a lookup 701 to determine the destination instance where the data should be delivered. Using the usage information from the resource monitoring entity 103, the LB computes 702 how long an instance can be executed without interruption. The LB is application aware and it knows how long a job takes to be executed. The LB computes 703 the number of jobs that can be executed within this time and the LB appends 704 a job counter to the delivered frames, which counter is read 705 by the LB agent 107 in the first VM instance 108 and tells the LB agent to suspend 707 its own execution after the first number of jobs have been executed 706.

This means that the CPU scheduler 104 may select 708 the second VM instance 109 for job execution.

In this case, the LB 105 has a knowledge of the processing load of the different VM instances and can optimize the sequentially processed jobs from an overall execution perspective. If one VM instance has more jobs than the other VM instance, it can get allotted a larger share of the processing time compared to the other VM instance(s).

Example 2—Adding Suspend Frames

Figure 8:
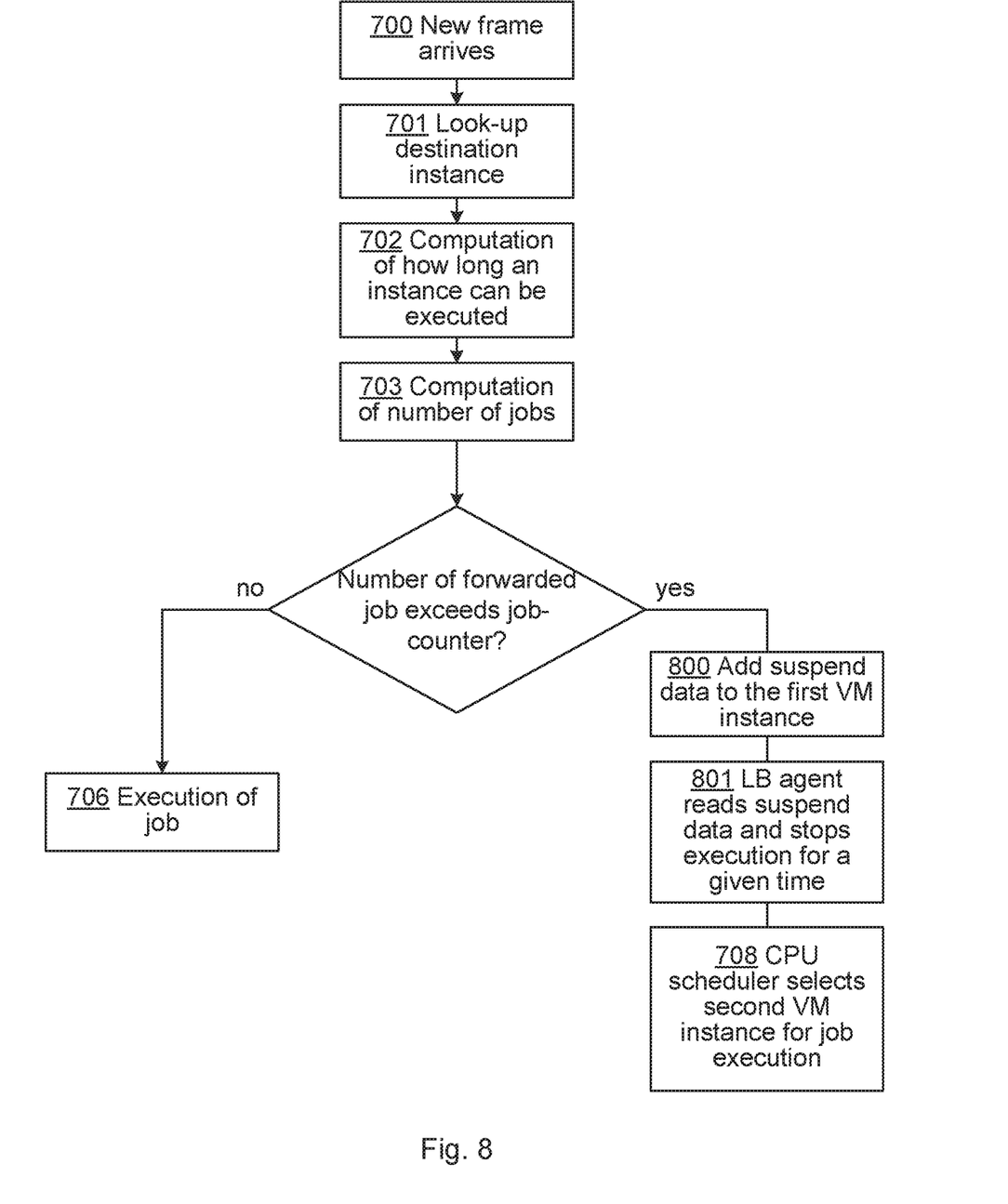
FIG. 8 is a schematic flow chart of another example embodiment of the method of the present disclosure.

Reference is made to FIG. 8 and only parts differing from FIG. 7 are discussed. An alternative to the embodiment of example 1 may be that the LB 105 adds 800 suspend data in between the data of two sequential jobs to the application of the first VM instance 108. This suspend data may contain the amount of time that the first VM instance needs to be suspended. The LB agent 107 will read 801 and discard such data and stops execution for a given time, e.g. puts the first VM instance into sleep for a predefined time or the time provided in the suspend data. This solution is transparent to the application as well as the operating system.

Example 3—Switching Granularity

Figure 9:
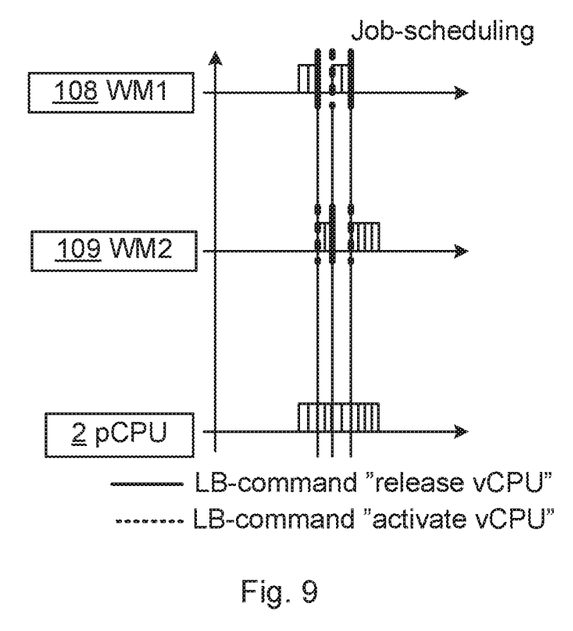
FIG. 9 illustrates dividing processing resources of a CPU between two VM instances in accordance with embodiments of the present disclosure.

FIG. 9 illustrates the results of applying an embodiment of the method proposed in this disclosure to a host of first and second VM instances 108 and 109. Scheduler granularity when used with VMs, which are considered black boxes, produces jitter in the execution of the jobs because it usually holds the processing circuitry (here called physical CPU, pCPU) 2 until it exceeds its time budget and is cut off. The smallest budget might still be too high in some delay sensitive network applications. It can be seen that the switching between execution of the jobs of the two VM instances may be done with a finer granularity and without interrupting a job execution, with commands from the LB 105 to each of the first and second VM instances to either activate its virtual CPU (vCPU) or to release its vCPU.

Example 4—Data Reception

Figure 10:
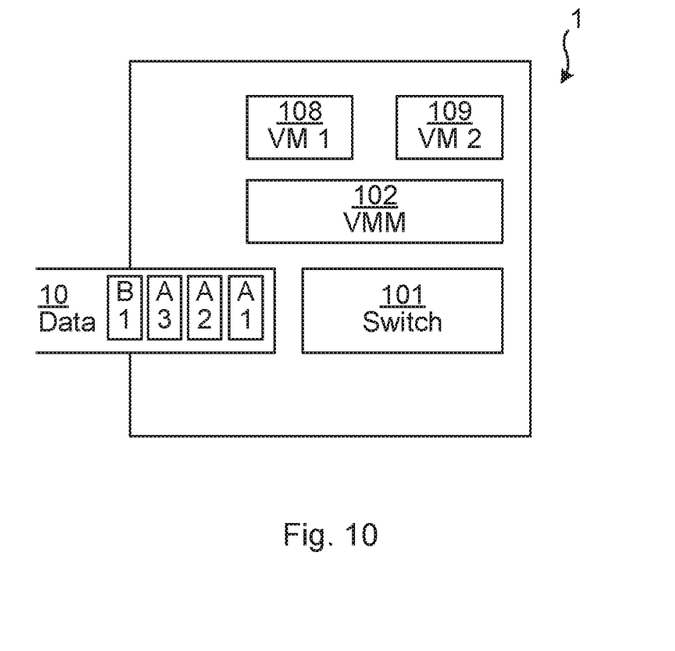
FIG. 10 is a schematic block diagram illustrating a data stream being received in a VM host in accordance with embodiments of the present disclosure.

FIG. 10 illustrates a data 10 stream comprising jobs A to the first VM instance 108 and jobs B to the second VM instance 109. There are four arriving jobs in the order illustrated (A1, A2, A3, B1) where the letter (A or B) denotes the destination VM instance 108 or 109 and the number is the job number for this example.

Figure 11:
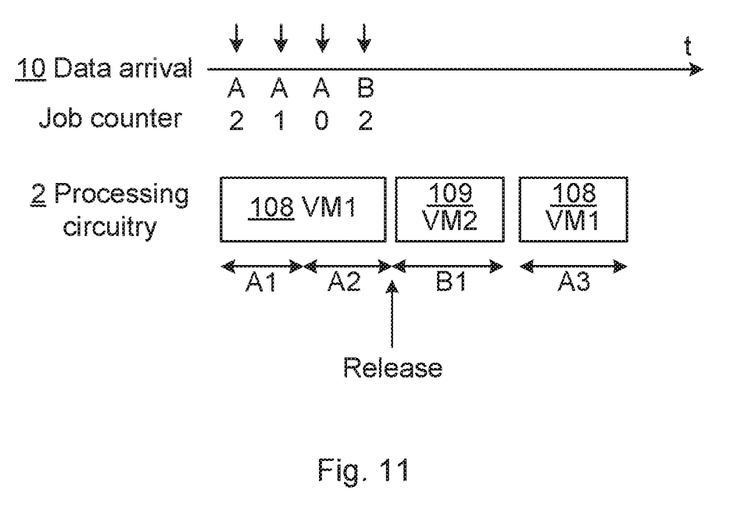
FIG. 11 illustrates dividing processing resources of a CPU between two VM instances based on number of jobs, in accordance with embodiments of the present disclosure.

FIG. 11 illustrate the time when the different jobs of the data stream in FIG. 10 are arriving and when the jobs are delivered to the first and second VM instances 108 and 109. It is also shown how the processing circuitry 2 processes the different jobs. It is assumed that the processing time is two times the receiving time. Also, it is assumed that the LB 105 decides that an acceptable continuous execution time is 2, i.e. both the first and the second number of jobs is 2. A credit-based method is controlled by the LB 105. When jobs A1 and A2 arrive, both VM instances are idle and therefore the first VM instance 108 can execute the jobs A1 and A2. The LB 105, sets the job counter (allowed jobs remaining for the first VM instance) for A1 and A2 to 2 and 1, respectively. When A3 arrives, the first VM instance is still executing and the LB sets the job counter (allowed jobs remaining) for the first VM instance to 0. This will tell the LB agent 107 of the first VM instance to suspend the execution of its jobs A when the A3 data is received, to release the processing circuitry 2 and allow the second VM instance to execute its job B1. Since the job B1 arrives before the job A2 is finished being executed, B1 will receive job counter 2 (allowed jobs remaining for the second VM instance is 2). When A2 is finished being executed, the next job will be A3, but since it has the job counter equal to 0, the first VM instance voluntary suspends its execution, in case there are other jobs to be executed. When B1 is finished being executed by the second VM instance, the first VM instance is allowed to reactivate the processing circuitry since is the only VM instance with a job waiting and A3 is executed.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a load balancer of a network arrangement configured to balance processing loads to a first and a second virtual machine (VM) instance contained within a single virtual machine, the network arrangement comprising at least a processing circuitry to run the first and second VM instances, and the load balancer connected to the first and second VM instances via a network interface controller (NIC), the method comprising:
   obtaining first information about usage of the processing circuitry of the network arrangement when a first application runs on the first VM instance;
   obtaining second information about usage of the processing circuitry when a second application runs on the second VM instance, wherein the first and second VM instances execute on the same processing circuitry of the network arrangement;
   receiving first incoming data corresponding to a first plurality of jobs to be executed by the first VM instance;
   receiving second incoming data corresponding to a second plurality of jobs to be executed by the second VM instance;
   determining a first job count limit for how many of the first plurality of jobs the first VM instance is allowed to execute using the processing circuitry before releasing the processing circuit, based on a combination of the obtained first information, the obtained second information, a total number of jobs in the first plurality of jobs indicated by the received first incoming data to be executed by the first VM instance, a total number of jobs in the second plurality of jobs indicated by the received second incoming data to be executed by the second VM instance, an amount of time each job of the first plurality of jobs will take to execute on the first VM instance and an amount of time each job of the second plurality of jobs will take to execute on the second VM instance;
   determining a second job count limit for how many of the second plurality of jobs the second VM instance is allowed to execute using the processing circuitry before releasing the processing circuit, based on a combination of the obtained first information, the obtained second information, the total number of jobs in the first plurality of jobs indicated by the received first incoming data to be executed by the first VM instance, the total number of jobs in the second plurality of jobs indicated by the received second incoming data to be executed by the second VM instance, an amount of time each job of the second plurality of jobs will take to execute on the second VM instance and an amount of time each job of the first plurality of jobs will take to execute on the first VM instance;
   instructing the first VM instance to release the processing circuitry after the first VM instance completes execution of the first job count limit of the first plurality of jobs and before completing remaining jobs of the first plurality of jobs when the first job count limit is less than the total number of jobs in the first plurality of jobs, to allow the second VM instance to use the processing circuitry for execution of jobs in the second plurality of jobs;
   instructing the second VM instance to release the processing circuitry after the second VM instance completes execution of the second job count limit of the second plurality of jobs and before completing remaining jobs of the second plurality of jobs when the second job count limit is less than the total number of jobs in the second plurality of jobs, to allow the first VM instance to use the processing circuitry for execution of remaining jobs in the first plurality of jobs;
   responsive to determining the first VM instance has completed execution of the first job count limit of the first plurality of jobs, instructing the second VM instance to execute the second plurality of jobs; and
   responsive to determining the second VM instance has completed execution of the second job count limit of the second plurality of jobs, instructing the first VM instance to execute the remaining jobs of the first plurality of jobs.

2. The method of claim 1, further comprising:
   responsive to determining the first VM instance has completed execution of the first job count limit of the first plurality of jobs sending an order to the first VM instance to release the processing circuitry.

3. The method of claim 1, wherein the first and second VM instances are containers within a single virtual machine.

4. The method of claim 1, wherein the first and second VM instances are comprised in respective first and second virtual machines.

5. The method of claim 1, wherein the method is performed by a load balancer of the network arrangement, the load balancer is co-located with the first and second VM instances.

6. The method of claim 1, wherein the sending the first job count limit number comprises loading the first job count limit number into a job counter of the first VM instance; and the sending of the second VM instance comprises loading the second job count limit number into a job counter of the second VM instance.

7. A network arrangement configured to balance processing loads to a first and a second virtual machine (VM) instances contained within a single virtual machine, the network arrangement comprising:
processor circuitry;
a load balancer connected to the first and second VM instances via a network interface controller (NIC); and
storage storing instructions executable by said processor circuitry that when executed by said processor circuitry causes said network arrangement to operate to:
obtain first information about usage of the processing circuitry when a first application runs on the first VM instance;
obtain second information about usage of the processing circuitry when a second application runs on the second VM instance, wherein the first and second VM instances execute on the same processing circuitry of the network arrangement;
receive first incoming data corresponding to a first plurality of jobs to be executed by the first VM instance;
receive second incoming data corresponding to a second plurality of jobs to be executed by the second VM instance;
determine a first job count limit for how many of the first plurality of jobs the first VM instance is allowed to executed using the processing circuitry before releasing the processing circuit, based on a combination of the obtained first information, the obtained second information, a total number of jobs in the first plurality of jobs indicated by the received first incoming data to be executed by the first VM instance, and a total number of jobs in the second plurality of jobs indicated by the received second incoming data to be executed by the second VM instance, and an amount of time each job of the first plurality of jobs will take to execute on the first VM instance and the amount of time each job of the second plurality of jobs will take to execute on the second VM instance;
determine a second job count limit for how many of the second plurality of jobs which the second VM instance is allowed to execute using the processing circuitry before releasing the processing circuit, based on a combination of the obtained first information, the obtained second information, the total number of jobs in the first plurality of jobs indicated by the received first incoming data to be executed by the first VM instance, and the total number of jobs in the second plurality of jobs indicated by the received second incoming data to be executed by the second VM instance, and an amount of time each job of the second plurality of jobs will take to execute on the second VM instance and the amount of time each job of the first plurality of jobs will take to execute on the first VM instance;
instruct the first VM instance to release the processing circuitry after the first VM instance completes execution of the first job count limit of the first plurality of jobs and before completing remaining jobs of the first plurality of jobs when the first job count limit is less than the total number of jobs in the first plurality of jobs, to allow the second VM instance to use the processing circuitry for execution of jobs in the second plurality of jobs;
instruct the second VM instance to release the processing circuitry after the second VM instance completes execution of the second job count limit of the second plurality of jobs and before completing remaining jobs of the second plurality of jobs when the second job count limit is less than the total number of jobs in the second plurality of jobs, to allow the first VM instance to use the processing circuitry for execution of remaining jobs in the first plurality of jobs;
responsive to determining the first VM instance has completed execution of the first job count limit of the first plurality of jobs, instructing the second VM instance to execute the second plurality of jobs; and
responsive to determining the second VM instance has completed execution of the second job count limit of the second plurality of jobs, instructing the first VM instance to execute the remaining jobs of the first plurality of jobs.

8. The network arrangement of claim 7, wherein the storage further stores instructions executable by said processor circuitry to respond to determining the first VM instance has completed execution of the first job count limit of the first plurality of jobs by sending an order to the first VM instance to release the processing circuitry.

9. The network arrangement of claim 7, wherein the first and second VM instances are containers within a single virtual machine.

10. The network arrangement of claim 7, wherein the first and second VM instances are comprised in respective first and second virtual machines.

11. The network arrangement of claim 7, wherein the processing circuitry of the network arrangement comprises a load balancer configured to execute the stored instructions and is co-located with the first and second VM instances.

12. The network arrangement of claim 11, wherein the load balancer is configured to execute the stored instructions on the same processing circuity of the network arrangement that the first and second VM instances execute on.

13. The network arrangement of claim 7, wherein the load balancer is configured to execute the stored instructions using processing circuitry of the network arrangement that is separate from the same processing circuitry the first and second VM instances execute on.

14. A computer program product comprised on a non-transitory computer readable medium, the computer program product balances processing loads to a first and a second virtual machine (VM) instance contained within a single virtual machine, the computer program comprising computer program code which, when run on processor circuitry of a network arrangement, causes the network arrangement to:
obtain first information about usage of the processing circuitry when a first application runs on the first VM instance;
obtain second information about usage of the processing circuitry when a second application runs on the second VM instance, wherein the first and second VM instances execute on the same processing circuitry of the network arrangement;
receive first incoming data corresponding to a first plurality of jobs to be executed by the first VM instance;
receive second incoming data corresponding to a second plurality of jobs to be executed by the second VM instance;
determine a first job count limit for how many of the first plurality of jobs the first VM instance is allowed to execute using the processing circuitry before releasing the processing circuit, based on a combination of the obtained first information, the obtained second information, a total number of jobs in the first plurality of jobs indicated by the received first incoming data to be executed by the first VM instance, and a total number of jobs in the second plurality of jobs indicated by the received second incoming data to be executed by the second VM instance, and an amount of time each job of the first plurality of jobs will take to execute on the first VM instance and the amount of time each job of the second plurality of jobs will take to execute on the second VM instance;

determine a second job count limit for how many of the second plurality of jobs the second VM instance is allowed to execute using the processing circuitry before releasing the processing circuit, based on a combination of the obtained first information, the obtained second information, the total number of jobs in the first plurality of jobs indicated by the received first incoming data to be executed by the first VM instance, and the total number of jobs in the second plurality of jobs indicated by the received second incoming data to be executed by the second VM instance, and an amount of time each job of the second plurality of jobs will take to execute on the second VM instance and the amount of time each job of the first plurality of jobs will take to execute on the first VM instance;

instruct the first VM instance to release the processing circuitry after the first VM instance completes execution of the first job count limit of the first plurality of jobs and before completing remaining jobs of the first plurality of jobs when the first job count limit is less than the total number of jobs in the first plurality of jobs, to allow the second VM instance to use the processing circuitry for execution of jobs in the second plurality of jobs;

instruct the second VM instance to release the processing circuitry after the second VM instance completes execution of the second job count limit of the second plurality of jobs and before completing remaining jobs of the second plurality of jobs when the second job count limit is less than the total number of jobs in the second plurality of jobs, to allow the first VM instance to use the processing circuitry for execution of remaining jobs in the first plurality of jobs;

responsive to determining the first VM instance has completed execution of the first job count limit of the first plurality of jobs, instructing the second VM instance to execute the second plurality of jobs; and responsive to determining the second VM instance has completed execution of the second job count limit of the second plurality of jobs, instructing the first VM instance to execute the remaining jobs of the first plurality of jobs.

* * * * *